United States Patent [19]

Entrup

[11] 4,445,876
[45] May 1, 1984

[54] ADJUSTABLE FRICTION OVERLOAD CLUTCH

[75] Inventor: Hubert G. Entrup, Lohmar, Fed. Rep. of Germany

[73] Assignee: Jean Walterscheid GmbH, Lohmar, Fed. Rep. of Germany

[21] Appl. No.: 321,528

[22] Filed: Nov. 16, 1981

[30] Foreign Application Priority Data

Nov. 29, 1980 [DE] Fed. Rep. of Germany ....... 3045070

[51] Int. Cl.$^3$ .............................................. F16D 7/02
[52] U.S. Cl. ........................................ 464/48; 464/46
[58] Field of Search ................ 464/45, 46, 48, 84, 464/100, 101; 192/56 R

[56] References Cited

U.S. PATENT DOCUMENTS

| | | | |
|---|---|---|---|
| 857,632 | 6/1907 | Kihlgren | 464/46 X |
| 1,427,025 | 8/1922 | Schlafly | 464/46 |
| 2,939,301 | 6/1960 | Huddle | 464/48 X |
| 3,118,292 | 1/1964 | Schroter et al. | 464/46 X |
| 3,122,903 | 3/1964 | Ramsden | 464/48 |
| 3,345,833 | 10/1967 | Burrows | 464/48 |

FOREIGN PATENT DOCUMENTS 1195208 6/1970 United Kingdom .................. 464/46

Primary Examiner—Stuart S. Levy
Assistant Examiner—Daniel P. Stodola
Attorney, Agent, or Firm—Toren, McGeady and Stanger

[57] ABSTRACT

In an adjustable friction overload clutch for protecting the drive line between a power take-off shaft on a tractor and an agricultural implement, one or more Belleville spring washers bias plates and friction discs together. Adjustable bolts extend through the Belleville spring washer and are attached to the plate adjacent to the washer. Springs are held by the bolts and extend between the Belleville spring washer and a nut on the bolt. By adjusting the bolts, a variable torque can be set which is less than the maximum torque exerted by the Belleville spring washer when it is initially assembled on the clutch.

5 Claims, 3 Drawing Figures

ADJUSTABLE FRICTION OVERLOAD CLUTCH

SUMMARY OF THE INVENTION

The present invention is directed to an adjustable friction overload clutch for protecting the drive line between a power take-off shaft of a tractor and an agricultural implement or similar arrangement with the clutch including friction discs placed between plates with the discs and plates being biased together by one or more Belleville spring washers. The clutch includes fixed stops which support the Belleville spring washers and a plate is positioned adjacent the Belleville spring washers. Adjustable bolts extend through the Belleville spring washer and are attached to the adjacent plate.

A friction clutch of the general type described above is disclosed in the Federal Republic of Germany Gebrauchsmuster 19 83 847. This utility model discloses a friction clutch in which the Belleville spring washer is supported on and pretensioned against fixed stops located in the clutch drum or housing. In case of an emergency, it is possible to open the clutch without using special tools, in particular a press, since a pressure plate adjoining the Belleville spring washer is provided with threaded bores aligned with corresponding openings in the washer. To disassemble the clutch, cap bolts with nuts can be introduced into the threaded bores, and by tightening the nuts the pressure plate is tensioned against the Belleville spring washer so that the clutch may be opened without any risk. With such a clutch, however, there is the disadvantage, especially when the clutch is new, due to the improved running-in condition of the linings, that an initial increase in the friction coefficient can be expected. If this occurs the drive-line to be protected may be overloaded and when such a condition has occurred in the past the attached implements have been destroyed. This clutch has no adjustment features for adapting the nominal torque to actual conditions.

A known adjustable friction clutch is disclosed in the Federal Republic of Germany Auslegeschrift 11 94 654. In that clutch, the force of the Belleville spring washer determining the torque is adjustable by a nut. The nut is provided with uniformly angularly spaced studs permitting an additional precise adjustment of the clutch.

In this clutch, the nut is used for providing an initial setting in the assembly of the clutch and, subsequently, by manipulating the studs, it is possible to adapt the clutch to existing conditions.

This friction clutch has the disadvantage that the nominal torque of the clutch can be set at any level both by means of the nut and of the studs and the setting may be such that the clutch is unable to protect the drive-line or an attached implement.

Therefore, it is the primary object of the present invention to provide an adjustable friction overload clutch which can be set in the factory at a maximum torque and is adjustable subsequently, but only to provide a torque less than the maximum torque.

In accordance with the present invention, springs, held by stay bolts, are supported between the Belleville spring washer or washers and adjusting nuts on the stay bolts.

A particular advantage of this arrangement is that the force of the springs held by the stay bolts acts counter to the standard force of the Belleville spring washers and when the adjusting nuts are tightened the spring force establishing the torque of the friction clutch can only be reduced, but not increased.

In one preferred embodiment of the invention, each of the stay bolts is provided with a helical spring.

Such an arrangement affords a simple adjustment of the friction clutch, and, in addition, by selecting suitable helical springs of different characteristics, a relatively wide torque range can be covered. In another preferred embodiment of the invention, leaf springs are arranged extending transversely of the bolt axes with the opposite ends of the springs held on a pair of adjacent stay bolts. Intermediate the ends held by the bolts, the leaf springs are supported against the Belleville spring washers.

This arrangement permits the friction clutch to be especially short in its axial direction, since the leaf springs add very little to the axial length of the clutch. Another advantage is that a single clutch design can be used to cover two-speed ranges which at the present time are frequently available in power take-off shafts for agricultural implements. It is possible to operate the clutch at 540 min$^{-1}$ at full nominal torque without any additional springs and at 1000 min$^{-1}$ at a torque reduced by the springs.

The various features of novelty which characterize the invention are pointed out with particularity in the claims annexed to and forming a part of this disclosure. For a better understanding of the invnetion, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
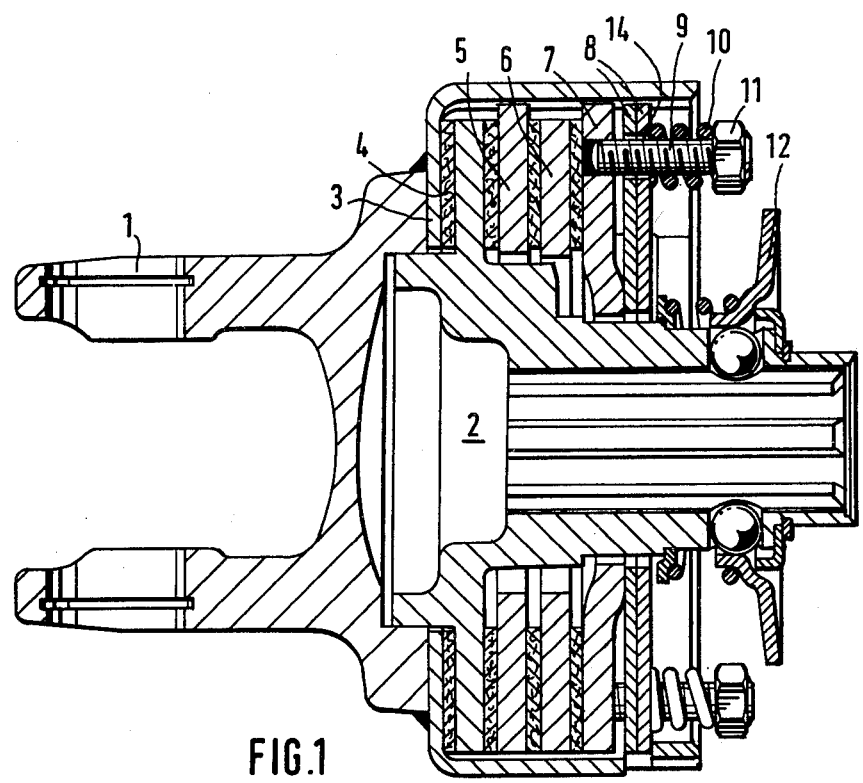
FIG. 1 is an axially extending sectional view through a friction clutch embodying the present invention and taken along the line A-B in FIG. 2.
Figure 2:
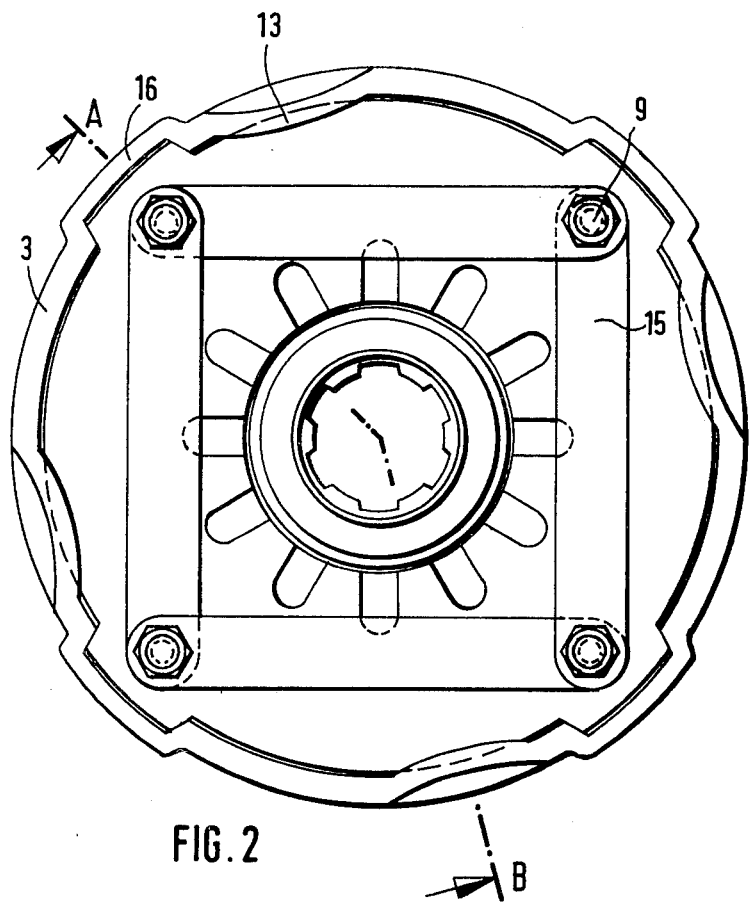
FIG. 2 is a plan view of a friction clutch embodying the present invention and similar to the clutch shown in FIG. 1, however, utilizing leaf springs instead of helical springs.

In FIG. 1 a friction clutch is illustrated including a joint yoke 1 connected to a drive shaft via a spider, neither of which are shown. Joint yoke 1 is welded to a clutch drum 3 which encloses the clutch to prevent any sparking which could be dangerous in an agricultural environment. Within the clutch drum 3 there are a plurality of pressure plates 5, 6 and 7 extending transversely of the axis of the clutch. The plates are spaced apart in the axial direction and friction discs or linings 4 are located between the plates. Axially extending grooves 16, note FIG. 2, are formed in the clutch drum 3 and secure the pressure plates 5, 7 against rotation. Within the drum 3, adjacent the plate 7, there are two Belleville spring washers 8 and the radially outer edges of the washers are also secured non-rotatably within the grooves 16. A slip-on hub 2 forms the clutch hub and is secured in the axial direction by a high-speed lock 12 positioned, for example, on the power take-off shaft of a tractor or an implement, not shown. Between the plates 5 and 7 is pressure plate 6 which is held against rotation on the hub. The friction linings 4 transmit torque between the clutch hub 2 and the clutch drum 3 with the pressure plates non-rotatably connected to one or the other. In addition to the pressure plate 6, another pressure plate is located between plate 5 and the end of the drum connected to the yoke 1.

At its radially inner periphery, the pressure plate 7 is bent toward the adjoining Belleville spring washer 8, the radially inner part of the Belleville spring washers 8 are supported on the inner bent portion of the pressure plate 7 while its radially outer periphery rests against fixed stops 13, note FIG. 2, formed by deforming the clutch drum 3 inwardly providing inwardly directed projections.

Openings 14 are formed in the Belleville spring washers 8 and stay bolts 9 extend through these openings and are secured to the pressure plate 7. The stay bolts 9 are secured to the pressure plate 7, at locations spaced radially outwardly from the bent portion which contacts the inner periphery of the adjacent Belleville spring washer 8. In FIG. 1, a helical spring 10 encircles each of the stay bolts 9 and the force of the spring acting against the Belleville spring washers is adjustable by means of the adjusting nuts 11 threaded onto the bolts. To avoid displacement of the nuts 11 from the ends of the bolts, the ends of the bolts remote from the pressure plate 7 are upset.

In operation, the friction clutch will slip if the torque applied to it exceeds the torque transmitting capability of the pressure plates and friction discs as determined by the biasing force of the Belleville spring washers 8. If each nut 11 on the bolts 9 is tightened, increasing the force of each spring bearing against the Belleville spring washers 8, the force exerted by the Belleville spring washers is reduced. As a result, the torque transmission capability of the friction clutch can be changed from a set maximum value to any value below the maximum. Accordingly, it is not possible to overload the clutch and the likelihood of the destruction of part or all of the drive-line or the attached agricultural implement due to the transmission of an excessive torque is reduced or eliminated. Any subsequent adjustment of the nuts 11 on the bolts 9 will remain below the maximum value initially afforded by the Belleville spring washers 8.

Figure 3:
FIG. 3 is a section taken through one of the leaf springs illustrated in FIG. 2.

In FIG. 1 helical springs 10 act between the Belleville spring washers 8 and the nuts 11 on the bolts 9, however, in FIG. 2 the friction clutch has four leaf springs 15 associated with the bolts 9. Each leaf spring 15 extends between a different pair of bolts 9 so that the leaf springs define a hollow square. As can be seen in FIG. 3, between the ends of the leaf springs 15 fitted over the bolts 9, the leaf spring is deformed or offset toward the Belleville spring washers. In other words, the opposite ends of the leaf springs are spaced from the Belleville spring washers, but between their ends the leaf springs contact the Belleville spring washers. By tightening the nuts on the bolts in the clutch illustrated in FIG. 2, an increased spring force is applied by the leaf springs 15 against the Belleville spring washers 8 reducing the torque transmission capability of the clutch.

In addition to affording protection of drive lines and agricultural implements, the friction clutch embodying the present invention can be used whenever a clutch is required to be adjusted to predetermined load conditions, but where a given nominal torque must not be exceeded under any conditions.

While specific embodiments of the invention have been shown and described in detail to illustrate the application of the inventive principles, it will be understood that the invention may be embodied otherwise without departing from such principles.

I claim:

1. An adjustable friction overload clutch for protecting a drive-line, such as between a power take-off shaft on a tractor and an agricultural implement, comprising a plurality of parallel plates disposed in spaced relation to and extending transversely of and around an axis, friction discs located between said plates, means for supporting said plates, a Belleville spring washer assembly comprising at least one Belleville spring washer extending around the axis and having a radially inner edge closer to the axis and a radially outer edge more remote from the axis, said means including fixed stops for said at least one Belleville spring washer, one of said plates located adjacent said at least one Belleville spring washer, and bolts disposed radially outwardly from, generally parallel to and in angularly spaced relation about the axis, said bolts extend through said at least one Belleville spring washer and are attached to said plate located adjacent said at least one Belleville spring washer, wherein the improvement comprises that said one of said plates is in contact with said at least one Belleville spring washer adjacent the radially inner edge thereof and is in spaced relation from said at least one Belleville spring washer for the remainder of the radially outward extent thereof, said bolts extend through said at least one Belleville spring washer adjacent the radially outer edge thereof, a nut on each of said bolts adjacent the end of said bolts remote from the plate adjacent said at least one Belleville spring washer with said nut spaced from said at least one Belleville spring washer, springs held by said bolts between and in contact with said nuts and the opposite side of said at least one Belleville spring washer from the side in contact with the adjacent said one of said plates, and said nuts being adjustably positionable on said bolts for limiting the biasing force exerted by said at least one Belleville spring washer so that the adjustment of said nuts provides a reduced torque which is less than the maximum torque set when said at least one Belleville spring washer is initially assembled.

2. An adjustable friction overload clutch, as set forth in claim 1, wherein said springs held by said bolts comprise helical springs with each helical spring encircling a different one of said bolts.

3. An adjustable friction overload clutch, as set forth in claim 1, wherein said springs held by said bolts comprise leaf springs each extending transversely of the axial direction of said bolts with each said spring extending between an adjacent pair of said bolts.

4. An adjustable friction overload clutch, as set forth in claim 3, wherein each said leaf spring comprises a pair of opposite end parts and an intermediate part, said end parts being located in a common plane and said intermediate part being located in a plane offset from the plane of said end parts so that said end parts are in spaced relation to said at least one Belleville spring washer and said intermediate part contacts said at least one Belleville spring washer.

5. An adjustable friction overload clutch for protecting a drive-line such as between a power take-off shaft on a tractor and an agricultural implement, comprising a clutch drum arranged to be rigidly secured to a drive shaft and said drum being concentrically arranged about an axis, a hub located within and spaced radially inwardly from said drum, said hub being coaxial with said drum, a plurality of substantially parallel annular pressure plates disposed in spaced relation to and extending transversely of the axis within said drum, annular friction discs located between said pressure plates, said clutch drum including fixed stops, a Belleville spring washer assembly comprising at least one Belleville spring washer extending around the axis and having a radially inner edge closer to the axis and a radially outer edge more remote from the axis and disposed within said clutch drum adjacent one of said pressure plates with said at least one Belleville spring washer being supported against said fixed stops, and a plurality of stay bolts disposed radially outwardly from, generally parallel to and in angularly spaced relation about the axis of said drum and hub, said bolts extend through said at least one Belleville spring washer and are attached to said pressure plate located adjacent said at least one Belleville spring washer, wherein the improvement comprises that adjacent said at least one Belleville spring washer said pressure plate is in contact with said at least one Bellville spring washer adjacent the radially inner edge thereof and is in spaced relation from said at least one Belleville spring washer for the remaining radially outward extent thereof, said bolts extend through said at least one Belleville spring washer adjacent the radially outer edge thereof, a nut on each of said bolts adjacent the end of said bolt remote from said pressure plate adjacent said at least one Belleville spring washer, springs held by said bolts between and in contact with said nuts and the side of said at least one Belleville spring washer remote from the adjacent said pressure plate, and said nuts are adjustably positionable on said bolts for reducing the biasing force exerted by said at least one Belleville spring washer so that adjusting said nuts provides a torque which is less than a maximum torque set when said at least one Belleville spring washer is initially assembled in the clutch.

* * * * *